United States Patent [19]

Sauer

[11] Patent Number: 4,978,149

[45] Date of Patent: Dec. 18, 1990

[54] HOSE COUPLING

[75] Inventor: Heinz Sauer, Ronneburg, Fed. Rep. of Germany

[73] Assignee: Rasmussen GmbH, Maintal, Fed. Rep. of Germany

[21] Appl. No.: 345,632

[22] Filed: May 1, 1989

[30] Foreign Application Priority Data

May 4, 1988 [DE] Fed. Rep. of Germany ....... 3815170

[51] Int. Cl.⁵ .............................. F16L 33/20
[52] U.S. Cl. .................................. 285/256; 285/319; 285/921
[58] Field of Search ...................... 285/256, , 254, 253, 285/174, 319, 320, 921, 242, 239; 138/109

[56] References Cited

U.S. PATENT DOCUMENTS

| | | | |
|---|---|---|---|
| 1,253,309 | 1/1918 | Ulleland | 285/320 X |
| 3,603,621 | 9/1971 | Parsons | 285/921 X |
| 3,711,125 | 1/1973 | Dehar | 285/319 X |
| 4,486,034 | 12/1984 | Sauer | 285/319 X |
| 4,730,856 | 3/1988 | Washizu | 285/921 X |
| 4,753,459 | 6/1988 | Potier | 285/253 |
| 4,775,173 | 10/1988 | Sauer | 285/320 X |

FOREIGN PATENT DOCUMENTS 212881 4/1957 Australia .............................. 285/253

119043 1/1959 U.S.S.R. ............................. 285/256

Primary Examiner—Dave W. Arola
Attorney, Agent, or Firm—Peter K. Kontler

[57] ABSTRACT

A coupling for separably connecting one end portion of an elastic hose to a nipple at one end of a pipe has a sleeve with a circumferentially complete tubular section which is receivable in the end portion of the hose and can receive a portion of the nipple, and several substantially axially parallel elastic prongs which are engageable with an external retainer or with discrete external retainers of the nipple when the latter extends into the tubular section of the sleeve. A tubular clamping member is shrunk or otherwise applied around the end portion of the hose so that such end portion is clamped between the exterior of the tubular section and the clamping member. The entire tubular section and a portion at least of each prong is confined in the end portion of the hose when the latter is properly coupled to the nipple. This enables the hose to bias the prongs radially inwardly and to thus assist the innate elasticity of the prongs in engaging the external retainer or retainers of the nipple or to urge non-elastic prongs into such engagement. A sealing ring is inserted into an internal groove of the tubular section and sealingly engages the external surface of the nipple.

9 Claims, 1 Drawing Sheet

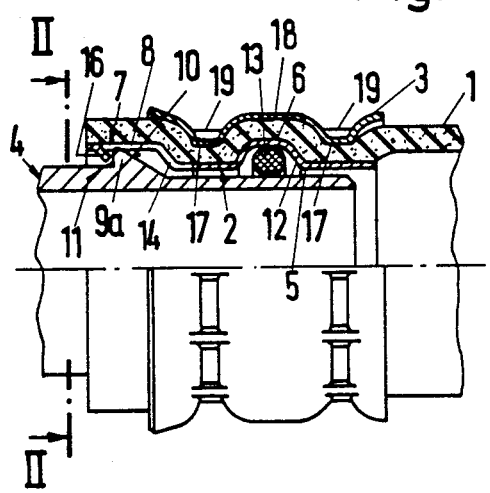
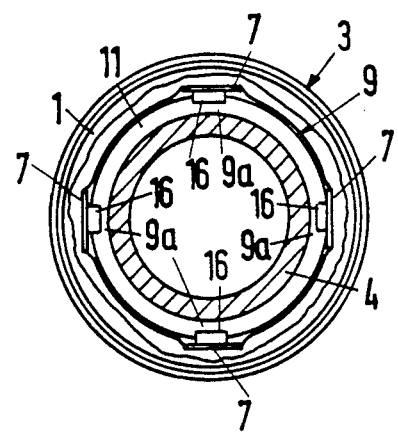
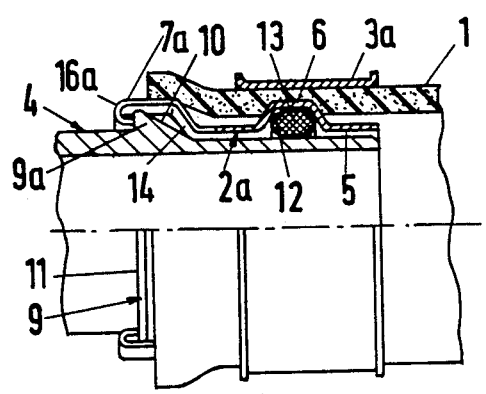

HOSE COUPLING

CROSS-REFERENCE TO RELATED CASES

The hose coupling of the present invention is similar to those which are disclosed in six commonly owned copending patent applications Ser. Nos. 345,635, 345,652, 345,636, 345,633, 345,680 and 345,679 of Heinz Sauer, all filed May 1, 1989.

BACKGROUND OF THE INVENTION

The invention relates to improvements in couplings in general, and more particularly to improvements in couplings which can be used to separably and sealingly connect one end portion of a first tubular component (e.g., a nipple at one end of a metallic or plastic pipe) to one end portion of a second tubular component, such as a hose which is made of an elastomeric material.

It is already known to provide a hose coupling with a tubular coupling member which includes a circumferentially complete tubular section and one or more substantially prong-like coupling elements engageable with a circumferentially complete retaining rib at the exterior of the end portion of the first component. The tubular section of the coupling member is receivable in the end portion of the hose, and the end portion of the hose can be clamped against the exterior of the tubular section by a contractible clamping member. The coupling elements are or can be made of a resilient material and normally extend in substantial parallelism with the axis of the tubular section. Commonly owned U.S. Pat. No. 4,775,173 to Sauer discloses a hose coupling wherein the coupling elements are disposed externally of and are integral with a tubular section which is insertable into the end portion of the first component as well as into the end portion of the second component. The coupling elements of the patented coupling are made of a resilient material and are disposed externally of the end portions of both components when the coupling is assembled. The arrangement is such that the pallets of the coupling elements automatically engage a retaining rib at the exterior of the first component when the tubular section is properly received in both end portions.

A drawback of the patented coupling is that the coupling elements are likely to be damaged during shipment, in storage or in assembled condition of the coupling. Moreover, the making of coupling elements which are integral with and extend radially outwardly from the tubular section is a costly procedure because such parts must be produced in specially designed machines.

OBJECTS OF THE INVENTION

An object of the invention is to provide a novel and improved coupling, particularly a hose coupling, which is constructed and assembled in such a way that the element or elements which couple the tubular section to the first component are less likely to be damaged than in heretofore known couplings.

Another object of the invention is to provide a coupling wherein the hose contributes to retention of one or more coupling elements in engagement with a nipple or a like tubular part.

A further object of the invention is to provide a novel and improved method of separably coupling one end portion of a hose to a nipple or to a like part.

An additional object of the invention is to provide the coupling with a novel and improved tubular coupling member which is simpler and less expensive than the corresponding coupling member of a conventional coupling.

Still another object of the invention is to provide a coupling wherein the tubular coupling member can be mass-produced in available machines from any one of a variety of different materials.

A further object of the invention is to provide a coupling wherein the coupling element or elements can remain in satisfactory engagement with one of the tubular components even if they do not exhibit any, or exhibit a minimum of, innate resiliency.

SUMMARY OF THE INVENTION

One feature of the invention resides in the provision of a coupling which is designed to establish a separable fluidtight connection between end portions of first and second tubular components, particularly between an end portion (such as a nipple) of a pipe and an end portion of an elastic hose. The improved coupling comprises a substantially sleeve-like tubular member having a circumferentially complete tubular section and a second section including at least one coupling element which is separably engageable with external retainer means (e.g., a tooth or a circumferentially complete rib) of the end portion of the first component. In accordance with a feature of the invention, the tubular member is constructed, designed and dimensioned in such a way that its tubular section and a portion at least of its second section (including the one or more coupling elements) are receivable in the end portion of the second component.

The second section can comprise a plurality of substantially prong-shaped coupling elements which preferably extend in substantial parallelism with the axis of the tubular section, and the coupling further comprises means for sealingly securing the end portion of the second component to the exterior of the tubular section.

The coupling elements are or can be flexible.

The coupling preferably further comprises one or more annular sealing elements (e.g., one or more O-rings) which are to be interposed between the exterior of the end portion of the first component and the interior of the tubular section. For example, the tubular section can be provided with one or more internal grooves for one or more sealing elements.

The aforementioned securing means can comprise a second tubular member which serves to surround and clamp the end portion of the second component against the exterior of the tubular section.

The second section of the tubular member which includes a tubular section is preferably designed in such a way that its coupling element or elements are integral with one axial end of the tubular section and preferably extend in substantial parallelism with the axis of such tubular section.

The wall thickness of the tubular section can equal or approximate the wall thickness of each coupling element. The arrangement is preferably such that each coupling element is integral with the tubular section.

Another feature of the invention resides in the provision of a method of sealingly and preferably separably coupling one end portion (e.g., a nipple) of a first tubular component (such as a metallic or plastic pipe) to one end portion of a second tubular component (particularly a hose which is made of an elastomeric material such as rubber or a synthetic plastic substance) by means of a tubular coupling member which has a circumferentially complete tubular section and at least one prong-like coupling element. The method comprises the steps of inserting the tubular section and at least a portion of the at least one coupling element into the end portion of the second component so that the end portion of the second component opposed a movement of the at least one coupling element radially outwardly of the second component, clamping the end portion of the second component around the inserted tubular section, and inserting the end portion of the first component into the tubular coupling member so that the at least one coupling element is outwardly adjacent the end portion of the first component and is held adjacent the end portion of the first component by the surrounding end portion of the second component.

The method can further comprise the steps of providing the end portion of the first component with an external retainer and engaging the retainer with the at least one coupling element as a result of insertion of end portion of the first component into the tubular coupling element.

The method can also comprise the step of biasing the at least one coupling element toward the exterior of the end portion of the first component through the medium of the end portion of the second component. This can be readily achieved by making at least the end portion of the second component of an elastomeric material and by dimensioning the end portion of the second component and the tubular coupling member in such a way that the end portion of the second component tends to move the at least one coupling element radially inwardly in response to proper insertion of the tubular coupling member into the end portion of the second component.

The method can further comprise the steps of making the at least one coupling element of a resilient material (e.g., spring steel) and imparting to the at least one coupling element a tendency to bear against the exterior of the end portion of the first component, at least when the at least one coupling element is inserted into the end portion of the second component and the end portion of the first component is inserted into the tubular coupling member.

Still further, the method can comprise the steps of making the entire tubular coupling member of a resilient material and making the at least one coupling element integral with one axial end of the tubular section.

The novel features which are considered as characteristic of the invention are set forth in particular in the appended claims. The improved hose coupling itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a partly elevational and partly axial sectional view of a fully assembled hose coupling which embodies one form of the present invention;

FIG. 2 is a sectional view substantially as seen in the direction of arrows from the line II—II of FIG. 1; and FIG. 3 is a partly elevational and partly axial sectional view of a fully assembled hose coupling which embodies another form of the invention.

DESCRIPTION OF PREFERRED EMBODIMENTS

The coupling which is shown in FIGS. 1 and 2 is used to separably and sealingly secure one end portion of an elastic hose 1 (second tubular component) to one end portion (here shown as a nipple 4) of a metallic pipe (first component). The coupling comprises a small number of discrete parts, namely a tubular coupling member 2 (hereinafter called sleeve for short), a tubular clamping member 3, and an annular sealing element 13 (e.g., an O-ring). The sleeve 2 includes a circumferentially complete tubular section 5 and a second section composed of one, two or more preferably equidistant axially parallel elastically deformable coupling elements or prongs 7 which are integral with and extend from one axial end of the tubular section 5. When the coupling is properly assembled, the entire tubular section 5 is confined in the end portion of the hose 1 and the clamping member 3 is applied around the end portion of the hose 1 so that such end portion is maintained in sealing engagement with the external surface of the tubular section 5. The clamping member 3 can be made of a ductile metallic sheet material which is properly deformed to establish a reliable seal between the external surface of the section 5 and the internal surface of the end portion of the hose 1.

In accordance with a feature of the invention, at least a portion of each prong 7 is also received in the end portion of the hose 1 so that the end portion of the hose opposes a movement of the prongs 7 radially outwardly and away from the axis of the sleeve 2 and preferably biases the prongs 7 toward such axis.

The tubular section 5 of the sleeve 2 is formed with a circumferentially complete corrugation 6 which provides the internal surface of the section 5 with a groove 12 for the sealing element 13. At least that portion of the corrugation 6 which is remote from the prongs 7 resembles or constitutes the frustum of a hollow cone to thus facilitate insertion of the section 5 and its corrugation 6 into the end portion of the hose 1. The inner diameter of the tubular section 5 is only slightly larger than the outer diameter of the nipple 4, and the dimensions of the sealing element 13 are selected in such a way that this element sealingly engages the surface surrounding the groove 12 as well as the adjacent portion of the exterior of the nipple 4 when the nipple is introduced into the sleeve 2.

FIG. 2 shows that the second section of the sleeve 2 is composed of four elastic prongs 7 which are equally spaced apart from each other in the circumferential direction of the tubular section 5. The free end portion of each prong 7 has a radially inwardly bent lug or pallet 16 which can engage a radially extending flank 11 forming part of an external retainer 9 provided on the nipple 4 and further having a second flank 10 which slopes radially inwardly in a direction from the flank 11 toward the free end of the nipple 4. The flank 10 acts as a ramp in that it causes the free end portions of the prongs 7 to move apart during insertion of the nipple 4 into the tubular section 5 of the sleeve 2. The innate resiliency of the prongs 7 and/or the bias of the end portion of the hose 1 causes the lugs or pallets 16 to engage the flank 11 and to thus lock the sleeve 2 to the nipple 4 as soon as the lugs 16 advance beyond the radially outermost portion of the retainer 9. At such time, portions 9a of the retainer 9 can penetrate into openings 8 which are formed in the prongs 7 as a result of making of the lugs 16. These lugs are integral portions of the respective prongs 7 and each prong is integral with the tubular section 5 of the sleeve 2. The retainer 9 constitutes a circumferentially complete rib and has four equidistant radially outwardly extending portions or projections 9a in the form of teeth each of which enters one of the openings 8 when the coupling of FIGS. 1 and 2 is properly assembled.

An advantage of the improved coupling is that the prongs 7 are at least partially but preferably completely or almost completely confined in the end portion of the hose 1. This greatly reduces the likelihood of accidental disengagement of the hose 1 from the nipple 4 as well as the likelihood of damage to the prongs. Moreover, the prongs 7 can properly engage the respective teeth 9a even if they are not made of a resilient material or even if the material of the prongs exhibits a minimum of resiliency. All that is necessary is to ensure that the end portion of the hose 1 can urge the prongs 7 radially inwardly toward the exterior of the nipple 4 when the latter is properly inserted into the sleeve 2.

Each prong 7 can be provided with a bend 14 which is adjacent the respective end of the section 5 and ensures that the lugs 16 are located radially outwardly of the section 5 when the sleeve 2 is not inserted into the hose 1. This ensures that the end portion of the hose 1 is more likely to bias the free ends of the prongs 7 radially inwardly and to maintain the prongs in proper engagement with the respective teeth 9a of the retainer 9 at the exterior of the nipple 4. The lugs 16 slope radially inwardly toward the section 5 of the sleeve 2 to further enhance the likelihood of reliable engagement with the radial flank 11 of the retainer 9 in fully inserted position of the nipple 4.

In order to assemble the improved coupling, the sleeve 2 is inserted into the end portion of the hose 1 and the clamping member 3 is placed around the end portion of the hose in the region of the section 5. The clamping member 3 is thereupon deformed at both sides of the corrugation 6 to form two radially inwardly extending corrugations 17 which flank the corrugation 6 and a radially outwardly extending corrugation 18 which surrounds the corrugation 6. This ensures the establishment of a reliable sealing action between the internal surface of the end portion of the hose 1 and the external surface of the section 5. The making of radially inwardly extending corrugations 17 entails the development of creases 19 which enhance the rigidity of the deformed clamping member 3. The corrugations 17 cooperate with the corrugation 6 to ensure that, once the clamping member 3 is deformed, the end portion of the hose 1 is reliably held against any axial movement relative to the section 5 of the sleeve 2.

When the assembly of the sleeve 2 with the end portion of the hose 1 is completed, i.e., when the deformation of the clamping member 3 is completed, the thus obtained assembly of sleeve 2, clamping member 3 and end portion of the hose 1 is slipped onto the nipple 4 or the nipple is introduced into the sleeve 2. At such time, the sealing element 13 is located in the groove 12 of the section 5. Insertion of the sleeve 2 into the end portion of the hose 1 can be facilitated by applying to the interior of the hose and/or to the exterior of the sleeve an evaporable friction reducing agent. As mentioned above, such insertion of the sleeve 2 into the end portion of the hose 1 takes place prior to deformation of the clamping member 3. Insertion of the sleeve 2 into the end portion of the hose 1 can be facilitated still further by making the corrugation 6 subsequent to insertion of the sleeve, e.g., simultaneously with the making of corrugations 17 and 19.

The inner diameter of the end portion of the hose 1 is preferably smaller than the diameter of the circle including the radially outermost portions of the prongs 7 in undeformed or unstressed condition of these prongs. This ensures that the end portion of the hose 1 bears against and urges the prongs 7 radially inwardly when the insertion of the sleeve 2 into the hose 1 is completed, when the prongs 7 are at least partially confined in the hose. Such biasing of the prongs 7 by the end portion of the hose 1 is desirable and advantageous because it further reduces the likelihood of accidental detachment of the lugs 16 from the radial flank 11 of the retainer 9. However, the elasticity of the end portion of the hose 1 suffices to ensure that the free end portions of the prongs 7 can move apart while their lugs 16 slide along the frustoconical flank 10 of the retainer 9 in a direction toward the flank 11. If the prongs 7 are produced in such a way that they exhibit a tendency to move their lugs 16 toward the axis of the sleeve 2, the elasticity of the end portion of the hose 1 merely assists the innate resiliency of the prongs 7 in ensuring that each lug 16 remains in engagement with the flank 11 until and unless an operator decides to move the free end portions 7 radially outwardly and away from the respective teeth 9a so that the nipple 4 can be extracted from the sleeve 2.

The lugs 16 cooperate with the end portion of the hose 1 to prevent or render highly unlikely accidental separation of the prongs 7 from the retainer 9. In fact, if a pull is exerted upon the hose 1 and/or upon the tubular component including the nipple 4 in a direction to extract the nipple from the sleeve 2, the inclination of the lugs 16 changes and each of these lugs tends to move closer to a full surface-to-surface engagement with the flank 11 of the retainer 9.

FIG. 3 shows a modified coupling wherein the sleeve-like tubular coupling member 2a is substantially identical with the sleeve 2 of FIGS. 1 and 2 except that its second section includes differently configured coupling elements or prongs 7a. The lugs 16 and the openings 8 of the prongs 7 are replaced with inwardly bent hook-shaped end portions 16a which can engage the radially extending flange 11 of a circumferentially complete rib-shaped retainer 9 which need not but may be provided with teeth 9a. Absence of the teeth 9a ensures that the sleeve 2a can receive the nipple 4 in any desired angular position in contrast to the sleeve 2 and nipple 4 of FIGS. 1–2 wherein the assembly of the coupling can be completed only if the angular orientation of the nipple 4 and sleeve 2 relative to each other ensures that each tooth 9a finds its way into one of the openings 8. Thus, the teeth 9a of the retainer 9 of FIG. 3 can be said to jointly constitute a circumferentially complete annular tooth.

The tubular clamping member 3a of the coupling which is shown in FIG. 3 is a relatively short cylinder which need not or cannot be deformed. However, its inner diameter is selected in such a way that the end portion of the hose 1 is adequately clamped between the external corrugation 6 of the tubular section 5 of the sleeve 2a and the internal surface of the clamping member 3a. The free end portions of the prongs 7a project beyond the end portion of the hose 1.

The sleeve 2 or 2a can be made of thin-walled metallic sheet material which exhibits at least some resiliency.

The wall thickness of the tubular portion 5 forming part of the sleeve 2 or 2a preferably equals or approximates the wall thickness of the prongs 7 or 7a. This contributes to simplicity and lower cost of the sleeve. Such sleeve can be readily made of tubular metallic or plastic stock.

It is within the purview of the invention to make the sleeve 2 or 2a of a ductile material or of a material which exhibits no resiliency or negligible resiliency. Furthermore, it is possible to make the sleeve 2 or 2a of suitable resilient, non-resilient or ductile plastic material, e.g., of a synthetic thermoplastic material.

It is further possible to design the sleeve 2 or 2a in such a way that its prongs 7 or 7a normally project radially outwardly well beyond the tubular section 5. The illustrated design, wherein the prongs 7 or 7a are substantially parallel with the axis of the section 5, is preferred at this time because the sleeve 2 or 2a can be introduced into the end portion of the hose with a minimum of effort.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A coupling for establishing a separable connection between end portions of first and second tubular components wherein the end portion of the first component has external retainer means and the end portion of the second component is elastic, particularly between an end portion of a first component in the form of a pipe and an end portion of a hose, comprising a substantially sleeve-like tubular member having a circumferentially complete tubular section and a second section including at least one flexible coupling element separably engageable with the external retainer means of the end portion of the first component, said tubular section and a portion at least of said at least one coupling element being receivable in the elastic end portion of the second component with attendant expansion of the elastic end portion so that the elastic end portion can maintain the at least one coupling element in engagement with the external retainer means.

2. The coupling of claim 1, wherein said second section includes a plurality of substantially prong-shaped coupling elements extending in substantial parallelism with the axis of said tubular section, and further comprising means for sealingly securing the end portion of the second component to the exterior of said tubular section.

3. The coupling of claim 2, further comprising an annular sealing element arranged to be interposed between the exterior of the end portion of the first component and said tubular section.

4. The coupling of claim 3, wherein said tubular section has an internal groove for said sealing element.

5. The coupling of claim 1, wherein said tubular section has a first end and a second end and said at least one coupling element is integral with and extends beyond one of said ends.

6. The coupling of claim 5, wherein said at least one coupling element is substantially parallel with the axis of said tubular section.

7. The coupling of claim 1, wherein said tubular section has a first wall thickness and said at least one coupling element has a second wall thickness which substantially equals said first wall thickness.

8. The coupling of claim 7, wherein said at least one coupling element is integral with said tubular section.

9. A coupling for establishing a separable connection between an end portion of a first tubular component wherein the end portion has external retainer means and an end portion of an elastic second tubular component, particularly between an end portion of a first component in the form of a pipe and an end potion of a hose, comprising a substantially sleeve-like tubular member having a circumferentially complete tubular section and a second section including a plurality of substantially prong-shaped coupling elements extending in substantial parallelism with the axis of the tubular section and separably engageable with the external retainer means of the end portion of the first component, said tubular section and a portion at least of said at least one coupling element being receivable in the end portion of the second component; and means for sealingly securing the end portion of the second component to the exterior of said tubular section, including a second tubular member arranged to surround and claim the end portion of the second component to the exterior of said tubular section.

* * * * *